Nov. 26, 1957     C. R. EKHOLM     2,814,378
CONVEYING SYSTEM HAVING DIVERTING MEANS
Filed Aug. 30, 1954     3 Sheets-Sheet 1

INVENTOR.
Cecil R. Ekholm
Rowland V. Patrick
BY
ATTORNEY

Nov. 26, 1957 C. R. EKHOLM 2,814,378
CONVEYING SYSTEM HAVING DIVERTING MEANS
Filed Aug. 30, 1954 3 Sheets-Sheet 2

INVENTOR.
Cecil R. Ekholm
Rowland V. Patrick
BY
ATTORNEY

Nov. 26, 1957  C. R. EKHOLM  2,814,378
CONVEYING SYSTEM HAVING DIVERTING MEANS
Filed Aug. 30, 1954  3 Sheets-Sheet 3
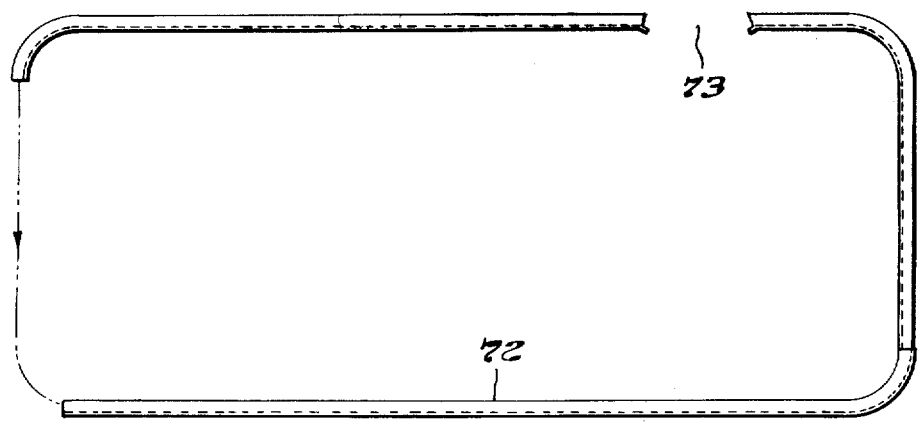
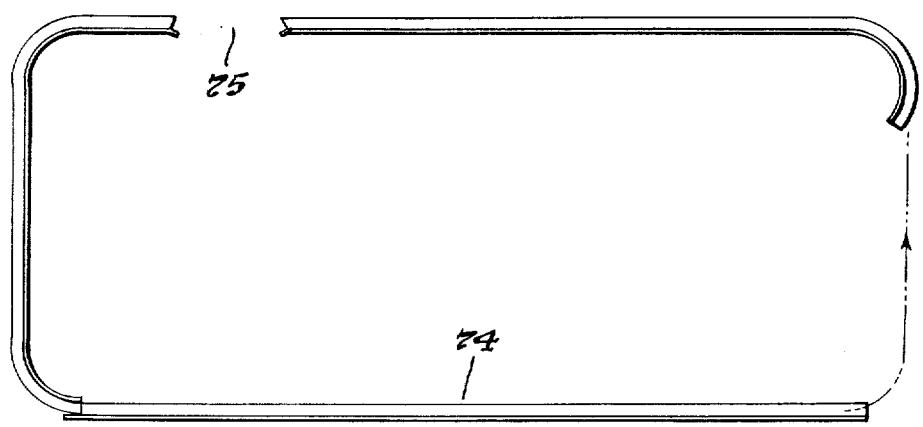
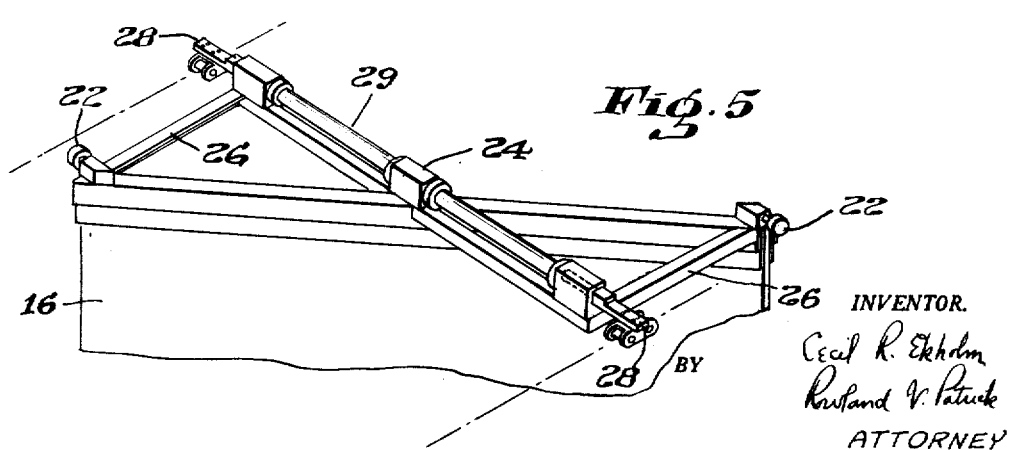
INVENTOR.
Cecil R. Ekholm
Rowland V. Patrick
ATTORNEY United States Patent Office 2,814,378
Patented Nov. 26, 1957

2,814,378

CONVEYING SYSTEM HAVING DIVERTING MEANS

Cecil R. Ekholm, Woodbridge, Conn.

Application August 30, 1954, Serial No. 453,033

5 Claims. (Cl. 198—185)

This invention relates to conveyer systems, and particularly to a conveyer system having provision for selectively diverting articles advancing along the conveyer from the conveyer at an intermediate point along the conveyer traverse.

In connection with conveyer systems, it is often desirable to divert articles from the main run at a variety of stations. In diverting the articles, however, it is essential, to prevent jamming and resulting operation interruption, that the articles diverted do not twist or otherwise depart from their designed line of travel.

Primary objects of the present invention are to provide apparatus which will reliably divert articles from a conveyer, as to a branch take-off or auxiliary conveyer running parallel thereto, while they maintain approximately the same relative position and alignment as on the main conveyer, and to eliminate, or reduce to a minimum, slippage between the article and the diverting mechanism, thus avoiding stoppages or rough handling of the articles while they are being diverted.

The invention is illustrated in the accompanying drawings, showing one type of device for accomplishing the above stated purposes, and wherein:

Fig. 3 is a detail elevational view of one of the tracks of the diverter of Fig. 1;

Fig. 4 is a detail elevational view of the other track of the diverter of Fig. 1, and Fig. 5 is a detail perspective view of certain portions of the diverter of Fig. 1.

Figure 1:
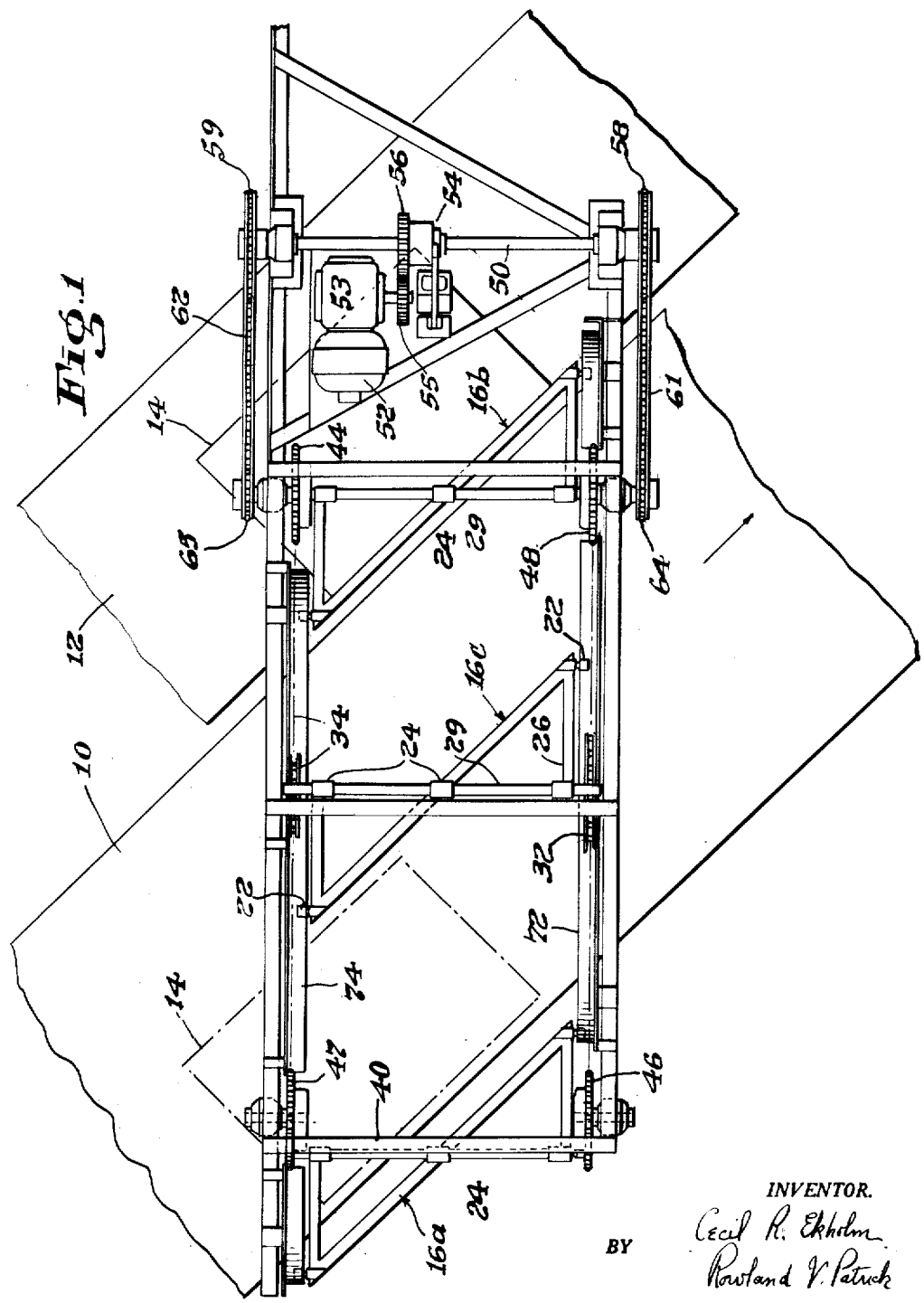
Fig. 1 is a plan view of a portion of a conveyer system showing a diverter of the invention.

Referring to Fig. 1, articles advancing along the main conveyer run 10 are transferred to an auxiliary conveyer run 12 with a minimum of slippage and in substantially the same relative positions they occupied on the main conveyer by means of vertical pusher plates 16 disposed parallel to the direction of travel of the main conveyer 10 and adapted to be moved across the main conveyer at an angle, so that an article 14 is moved directly sideways on the main conveyer to the auxiliary conveyer without any skidding, forward or backward, on the main conveyer, which would cause uncontrolled substantial departure from the designed path of travel and with a minimum of slippage between the pusher plate and the article being diverted.

The vertical plates travel across the main conveyer along a path making an angle to the line of conveyer travel, and their rate of travel is so related to the rate of travel of the main conveyer and the said angle that the component speed of the plates in the direction of main conveyer travel, as they cross the conveyer, is equivalent to the rate of the main conveyer as determined by the formula:

$$\cos \phi = V_1/V_2 \text{ or } V_2 = \frac{V_1}{\cos \phi}$$

where $V_1$ = the rate of travel of the main conveyer
$V_2$ = the rate of travel of the vertical plates, and
$\phi$ = the angle between the direction of travel of the vertical plates and the direction of travel of the main conveyer The auxiliary conveyer, if one is used, is preferably run at the same speed as the main conveyer and parallel thereto.

Thus, the article will be diverted to the auxiliary conveyer with only that slip between the pusher plate and the article which is incidental to acceleration and deceleration of the plate, etc., at the beginning and end of each cycle of plate movement.

Either a belt, gravity or live rollers may be used as the auxiliary conveyer.

The pusher plate mounting is of novel design.

Referring to Fig. 5, on the upper edge of vertical pusher plate 16 and extending therebeyond, are guide rollers 22 disposed at an angle of 90—$\phi$, where $\phi$ is as heretofore defined, to said vertical plate so that said guide rollers may roll in a path parallel to the direction of travel of the plates 16. A horizontal cross bar 24 is affixed to the upper edge of vertical plate 16 at the center of said edge also at an angle 90—$\phi$ to said edge. Chain fittings 28 are mounted at the outer extremities of cross bar 24 on shaft 29 which extends along cross bar 24, said shaft being arranged to rotate freely with said chain fittings. The cross bar 24 is braced by members 26 extending from the ends of said cross bar to the ends of the upper edge of vertical plate 16 to form a rigid assembly for effectively guiding, driving and bracing said vertical plates for moving articles across the main conveyer to the auxiliary conveyer as hereinafter more fully described.

Figure 2:
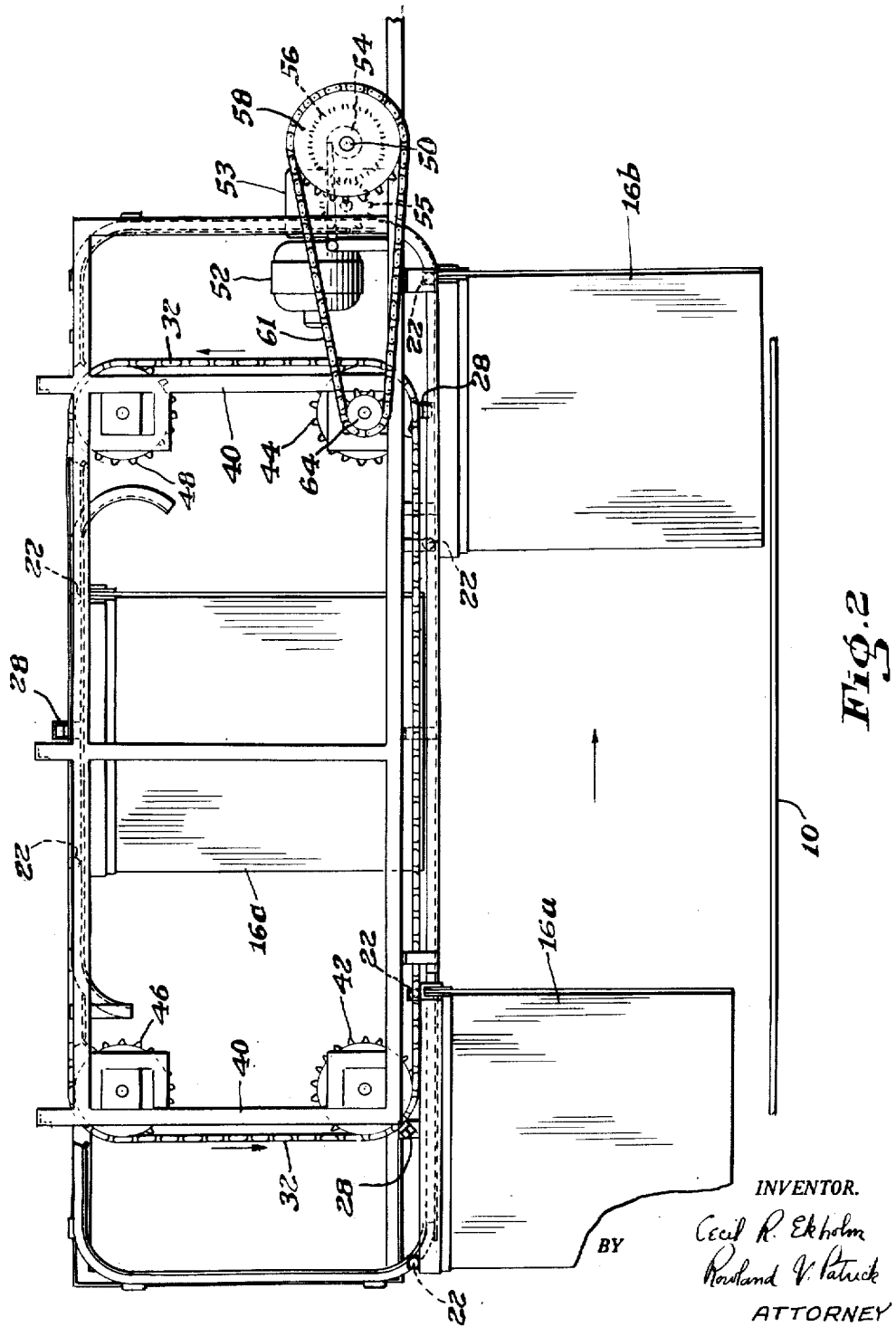
Fig. 2 is an elevational view of the structure shown in Fig. 1.

Referring to Figs. 1 and 2, the vertical plates 16a, 16b, and 16c are attached to the endless driving chains 32 and 34 by means of sprocket chain fittings 28 mounted on the ends of cross bar 24. Though I prefer to use three vertical plates, a greater or lesser number may be used, the only requirement being that a plate must be available to divert an article whenever such is desirable and that the main conveyer not be blocked by a plate when it is not desirable to divert an article. If more than one plate be used, it is desirable to mount said plates at equal intervals about said driving chains.

The endless driving chains 32 and 34 are supported on opposite vertical sides of the frame 40 by four pairs of sprockets, lower idler sprockets 42, and driven sprockets 44, and upper idler sprockets 46 and 47, and 48 and 49, all rotatably mounted on frame 40, so that the driving chains 32 and 34 move in a rectangular path such that a plate is at all times in readiness to divert an article but the main conveyer is not blocked when it is not desired to divert an article. To accomplish this end I prefer to use a vertical rectangular path for plates 16a, 16b, and 16c in which the vertical height is approximately one-half the horizontal length, and the return path for the plates 16 is well above the height of the articles 14, but obviously paths of other dimensions and shapes may be used.

One of said pairs of sprockets 44 is driven by motor 52 through gear box 53, spur gears 55 and 56, and a solenoid actuated single revolution clutch, indicated generally at 54, mounted on shaft 50. When said clutch is actuated, sprockets 44 are rotated by said clutch through a drive consisting of sprockets 58 and 59 mounted on shaft 50, chain drives 61 and 62, and sprockets 64 and 65. The gear ratio between clutch 54 and the sprockets 44 is arranged to operate the driving chains 32 and 34 through one-third of their endless paths, if three vertical pusher plates are used. If a different number of plates 16 is found desirable the gear ratio should be adjusted to operate the driving chains 32 and 34 through a fraction of their endless paths corresponding to the reciprocal of the number of plates.

The vertical plates 16a, 16b, and 16c are guided and braced against any twisting of said vertical plates and particularly against any pivoting of said plates about their upper edges due to the force required to move an article across the main conveyer to the auxiliary conveyer by means of rollers 22 running in tracks 72 and 74. These tracks may be seen more clearly in Figs. 3 and 4, where Fig. 3 shows the tracks 72 and Fig. 4 the track 74.

The track 72 is mounted on the frame 40 adjacent the driving chain 32, and is offset forwardly thereof thus supporting the forward edges of the vertical plates 16 through rollers 22, as said plates travel across the main conveyer toward the auxiliary conveyer.

The track 74 is mounted on the opposite side of frame 40 adjacent driving chain 34 but is offset backwardly thereof, thus supporting the rear edges of the vertical plates 16 through opposite rollers 22.

The tracks 72 and 74 are respectively provided with apertures 73 and 75 to allow clearance for sprockets 48 and 47. Other apertures may be provided if desired in sections of the tracks where bracing and guiding are not necessary, such as during vertical travel of the plates. However, it is desirable that tracks 72 and 74 extend at least across the bottom of the rectangular path to provide bracing for the plates during their travel across the main conveyer to move articles from the main to the auxiliary conveyer.

Operation

In operation, when it is desired to divert an article from the main conveyer run to an auxiliary run, the single revolution clutch 54 is actuated to operate the driving chains 32 and 34 for one-third of a cycle to move simultaneously plate 16a across the main conveyer to divert article 14 to auxiliary conveyer 12, move plate 16b vertically upward and approximately half the horizontal length of the upper flight of the driving chains 32 and 34 to an elevated position clear of articles 14 on the conveyer, and move plate 16c horizontally for approximately one-half the length of the upper flight of the driving chains and then vertically downward to a lowered position in readiness for the next article to be diverted. The cycle will be repeated for each article it is desired to divert.

The clutch 54 may be actuated electrically or otherwise from a distance by a remote control device, such as a micro-switch or photoelectric cell mounted for actuation by articles as they approach the diverter or by a timed memory device synchronized with the speed of the conveyer.

Though only one diverter has been shown, it is contemplated that a number of said diverters shall be set up in spaced relation along said main conveyer, each with an associated auxiliary conveyer for selectively diverting articles to the various auxiliary conveyers.

I claim:

1. In a conveying system having a main run, diverting means comprising a pair of horizontally spaced parallel endless driving members having lower traverses extending at an angle across and above said main run and upper return traverses, a plate pivotally suspended between said driving members and having a surface thereof disposed substantially parallel to the direction of travel of, and extending down towards, said main run, a guide roller mounted at each end of said plate and a track adjacent each of said driving members and arranged parallel thereto along said traverses for engaging said rollers to hold said plate in substantially vertical suspended position during its movement with said driving members along both said lower and said return traverses.

2. In a conveying system having a main run, diverting means as claimed in claim 1, wherein said endless driving members pivotally carry therebetween a bar extending normal thereto, said bar having members affixed thereto extending in opposite directions to ends of said plate to form with said plate a Z-shaped plate suspension.

3. In a conveying system having a main run, diverting means comprising a pair of horizontally spaced parallel endless driving members having lower traverses extending at an angle across and above said main run, a plurality of plates pivotally suspended between said driving members at equally spaced distances therealong and disposed substantially parallel to the direction of and extending down towards, said main run and upper return traverses, guide rollers mounted at both ends of said plates and tracks adjacent each of said driving members and arranged parallel thereto along said traverses engaging said rollers to hold said plates in substantially vertical suspended position during their movement with said driving members along both said lower and said return traverses.

4. In a conveying system as claimed in claim 3, means for driving said endless chain in cycles, each cycle constituting a driving member movement substantially equivalent to said spaced distances.

5. A conveying system as claimed in claim 4, wherein each cycle ends with positioning of one of said plates adjacent one side of said main run in readiness for passage along said lower traverses across said main run.

References Cited in the file of this patent

UNITED STATES PATENTS

| 2,444,323 | Klammt et al. | May 11, 1948 |
| 2,760,621 | Crescenzo | Aug. 28, 1956 |

FOREIGN PATENTS

| 39,987 | Germany | Dec. 10, 1909 |

UNITED STATES PATENT OFFICE

CERTIFICATE OF CORRECTION

Patent No. 2,814,378                          November 26, 1957

Cecil R. Ekholm

It is hereby certified that error appears in the printed specification of the above numbered patent requiring correction and that the said Letters Patent should read as corrected below.

Column 4, lines 31 and 32, strike out "and upper return traverses" and insert the same after "run" and before the comma in line 27, same column.

Signed and sealed this 4th day of February 1958.

(SEAL)
Attest:
KARL H. AXLINE

Attesting Officer

ROBERT C. WATSON
Commissioner of Patents